United States Patent
Marrese-Reading et al.

(10) Patent No.: US 8,850,792 B2
(45) Date of Patent: Oct. 7, 2014

(54) MICROFLUIDIC ELECTROSPRAY THRUSTER

(75) Inventors: Colleen M. Marrese-Reading, Valencia, CA (US); Juergen Mueller, Pasadena, CA (US); William C. West, South Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 836 days.

(21) Appl. No.: 12/975,124

(22) Filed: Dec. 21, 2010

(65) Prior Publication Data

US 2012/0144796 A1   Jun. 14, 2012

Related U.S. Application Data

(60) Provisional application No. 61/288,760, filed on Dec. 21, 2009.

(51) Int. Cl.
    *F03H 1/00* (2006.01)
    *F02G 1/00* (2006.01)
    *F02G 3/00* (2006.01)
    *B64G 1/40* (2006.01)

(52) U.S. Cl.
    CPC .............. *F03H 1/0012* (2013.01); *B64G 1/405* (2013.01); *F03H 1/0031* (2013.01)
    USPC ........................... 60/202; 60/200.1; 60/203.1

(58) Field of Classification Search
    USPC ...................................... 60/202, 203.1, 200.1
    See application file for complete search history.

(56) References Cited

U.S. PATENT DOCUMENTS

| 4,328,667 | A | 5/1982 | Valentian et al. |
| 6,097,139 | A | 8/2000 | Tuck et al. |
| 6,516,024 | B1 | 2/2003 | Dupuis et al. |
| 6,516,604 | B2 * | 2/2003 | Mojarradi et al. .............. 60/202 |
| 6,531,811 | B1 | 3/2003 | Kudo et al. |
| 6,741,025 | B2 | 5/2004 | Tuck et al. |
| 6,996,972 | B2 | 2/2006 | Song |
| 7,059,111 | B2 | 6/2006 | King |
| 7,238,952 | B2 | 7/2007 | Ohtsuka |
| 7,297,943 | B2 | 11/2007 | Tai et al. |
| 7,827,779 | B1 | 11/2010 | Krishnan et al. |
| 2008/0072565 | A1 | 3/2008 | Bekey |
| 2008/0083744 | A1 * | 4/2008 | Ruiz et al. ..................... 219/541 |
| 2009/0113872 | A1 | 5/2009 | Demmons et al. |
| 2009/0278434 | A1 | 11/2009 | Holland et al. |

FOREIGN PATENT DOCUMENTS

| GB | 2370519 | 7/2002 |
| WO | 2011079138 | 6/2011 |

OTHER PUBLICATIONS

International Search Report for International Application PCT/US2010/061616; Report completed May 4, 2011, mailed Oct. 28, 2011, 2 pgs.
Written Opinion for International Application PCT/US2010/061616; Report completed May 4, 2011, mailed Oct. 28, 2011, 7 pgs.

* cited by examiner

*Primary Examiner* — Phuttiwat Wongwian
*Assistant Examiner* — Jared W Pike
(74) *Attorney, Agent, or Firm* — KPPB LLP (57) ABSTRACT

An electrospray thruster and methods of manufacturing such thrusters are provided. The micro-electrospray thruster increases the thrust density of conventional electrospray thrusters by miniaturizing the individual components of the thruster thereby allowing for the increase in the number and density of the charged particle emitters.

30 Claims, 9 Drawing Sheets

FIG. 1A

Prior Art

FIG. 1B

Prior Art

MICROFLUIDIC ELECTROSPRAY THRUSTER

CROSS-REFERENCE TO RELATED APPLICATION

The current application claims priority to U.S. Provisional Application No. 61/288,760, filed Dec. 21, 2009, the disclosure of which is incorporated herein by reference.

STATEMENT OF FEDERAL FUNDING

The invention described herein was made in the performance of work under a NASA contract, and is subject to the provisions of Public Law 96-517 (35 USC 202) in which the Contractor has elected to retain title.

FIELD OF THE INVENTION

The present invention relates to a thruster for the propulsion of an object in space; and in particular, the invention relates to a microfluidic electrospray thruster.

BACKGROUND OF THE INVENTION

There is a rapidly growing commercial demand for small satellites, and, more particularly, for satellite instruments that demand precision control of position and orientation on small and large spacecraft. However, there is concomitant need for a significant reduction in the cost and complexity of these types of spacecraft and all of their subsystems for there to be broad application of such satellites in the commercial space industry.

In conventional satellites, thrust for station control and rapid maneuvers is provided to a spacecraft by chemical propulsion, such as via hydrazine or other rocket motors. However, the exhaust velocity of such chemical rockets is limited by the inherent specific energy released by combustion, accordingly, chemical rockets burn up more propellant to effect an orbital maneuver than would other forms of propulsion. Furthermore, the propellant reservoirs and feed systems for these types of chemical propulsion add prohibitively to the size, weight and complexity of the spacecraft, making them unusable for very small spacecraft or for highly distributed propulsion on very large space structures.

One form of propulsion that has gained a lot of recent interest is the electrospray thruster. An electrospray thruster is a form of electric propulsion for spacecraft that creates thrust from liquid propellants by ejecting and accelerating charged particles. Electric thrusters are categorized by how they accelerate the ions, using either electrostatic or electromagnetic forces. Electrostatic electrospray thrusters use the Coulomb force and accelerate charged particles in the direction of the electric field. Electromagnetic ion thrusters use the Lorentz force to accelerate the charged particles. Electrospray thrusters are more efficient than ion and Hall electrostatic thrusters. They also have the potential to be much more scalable in size, mass and thrust range to be applicable to very large and very small spacecraft. They currently operate at very low thrust levels on the order of microNewtons. The drawback of the low thrust is low spacecraft acceleration because the mass of current electric power units is directly correlated with the amount of power given. This low thrust makes electric thrusters unsuited for launching spacecraft into orbit, but they are ideal for in-space propulsion applications, such as station keeping, maneuvering and precision pointing.

Figure 1A:
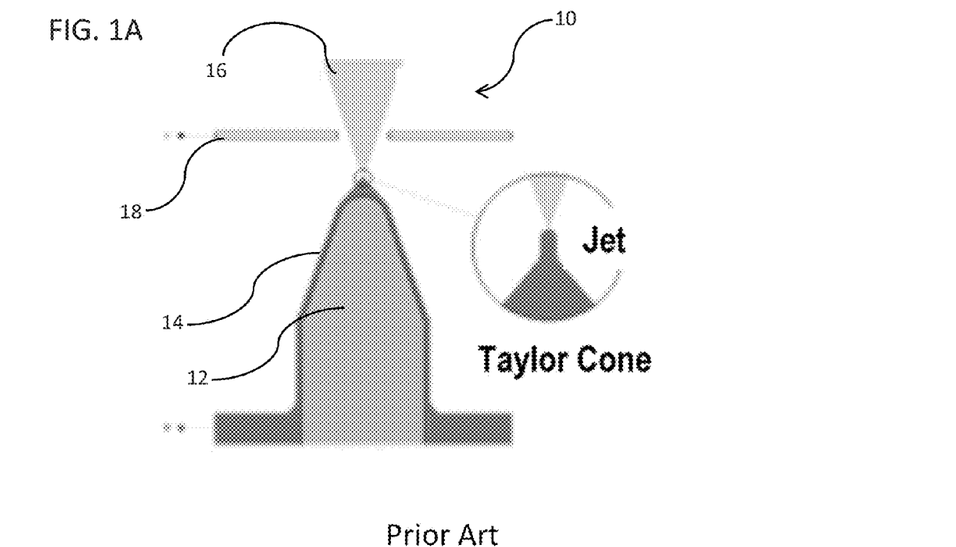
FIG. 1A shows a cross sectional view of a conventional macro field emission ion beam source.

Regardless of the method of accelerating the ions, all electrostatic thruster designs take advantage of the charge/mass ratio of the charged particles. Relatively small potential differences can create very high exhaust velocities that are on the order of thousands of seconds. As shown in FIG. 1A, a FEEP, and, for that matter any electrospray thruster, device consists essentially of an emitter, extractor electrode and possibly an accelerator electrode (downstream of the extractor electrode). (See, A. Genovese, et al., AIAA 2004-3620, 40th AIAA/ASME/SAE/ASEE Joint Propulsion Conference and Exhibit, July 2004, the disclosure of which is incorporated herein by reference.) The emitter is an externally wetted needle or an internally wetted capillary tube. A potential difference of the order of 5-10 kV is applied between the two electrodes, which generates a strong electric field at the tip of the emitter. The interplay of the electrostatic and surface tension forces generates surface instabilities, which give rise to Taylor cones (inset) on the liquid surface. At sufficiently high values of the applied field, charged particles are extracted from the cone tip by field evaporation or field ionization, which then are accelerated to high velocities on the order of tens of kilometers per second. A separate negative charged particle source is required to maintain spacecraft charge neutrality. This process of creating and accelerating charged particles is very efficient, with beam efficiencies greater than 90%.

Electrospray thrusters have been demonstrated and flight qualified to operate in either charged droplet at hundreds of seconds of specific impulse or in an ion emission mode at thousands of seconds at low thrust levels. (See, J. Ziemer, et al., AIAA 2008-4826, 44th AIAA/ASME/SAE/ASEE Joint Propulsion Conference and Exhibit, July 2008, the disclosure of which is incorporated herein by reference.) The specific charge of the charged particles with some propellants in these thrusters could be controlled for extraordinary specific impulse and thrust range capability. This propulsion approach reduces the amount of reaction mass or fuel required, but increases the amount of specific power required compared to chemical propulsion. Due to their very low thrust level capability (in the microNewton range), electrospray thrusters are primarily used only for microradian, microNewton attitude control on spacecraft, such as in the ESA/NASA LISA Pathfinder scientific spacecraft.

A number of different "fuels" can be used in these electrospray thrusters. Ionic liquids are typically used in 'colloid' electrospray thrusters to generate charged droplet beams, and have been demonstrated in ion and droplet emission modes and in positive and negative charged particle emission modes. The ionic liquid propellant is typically pushed to the emitter tip through a capillary tube from a pressurized reservoir and controlled by a piezo valve. Field Emission Electric Propulsion (FEEP) electrospray thrusters typically use liquid metal (usually either cesium or indium) as a propellant and generate ion beams. The propellant is stored as a solid, melted to flow, and pulled to the emitter tip along external grooves by capillary forces. Both types of propellants have been demonstrated in each type of emitter and have been demonstrated in both ion and droplet emission modes for a unique specific impulse range capability among electric thrusters of several hundred to several thousand seconds.

Examples of conventional FEEP devices can be found in U.S. Pat. No. 4,328,667 to Valentian et al., which describes a liquid metal ion thruster assembly having a plurality of hollow-cone tips coupled to a reservoir of liquid metal, where the metal ions are drawn from the tip by the electrostatic force generated by an adjacent electrode; U.S. Pat. Nos. 6,097,139 and 6,741,025 to Tuck et al., which describe the use of impurities on a surface for the formation of enhanced electric fields for use as composite field emitters; U.S. Pat. No. 6,516,024 to Mojarradi et al and U.S. Pat. No. 6,996,972 to Song, which describe a hollow tip liquid ion extractor assembly for generation of thrust; U.S. Pat. No. 7,059,111, which describes a thruster system whereby liquid metal ions are boiled from a reservoir and electro-statically attracted through a cylindrical ring, thereby generating thrust; and U.S. Pat. Nos. 6,531,811 and 7,238,952, which both describe an ion extractor having a reservoir opposite a needle tip and an extractor electrode, the disclosures of each of which are incorporated herein by reference.

Although there are a large number of prior art on liquid metal ion propulsion devices, none of these devices address the fundamental issues limiting the scalablilty and applicability of this thruster technology, which is low thrust density. Addressing this issue with microfabricated thruster components, a common propellant reservoir and a capillary force driven feed system will simultaneously improve the thrust range, thrust density, system performance, mass, volume and cost by more than 10× to enable this technology for an extremely broad range of mission applications and revolutionary propulsion capabilities.

SUMMARY OF THE INVENTION

The current invention is generally directed to a field emission electric propulsion thruster.

In one embodiment, the thruster includes the following elements:
- a surface roughened porous substrate having a plurality of emitters formed thereon;
- each of the emitters having at least one groove extending axially along the length of the emitter from the proximal to the distal end thereof;
- preferably each of the porous substrate and the emitters further include a metalized coating as a propellant wetting layer comprising at least a first Ti layer and a further layer of a propellant material;
- a heater capable of heating the substrate substantially uniformly to a temperature sufficient to melt the propellant and to reduce the viscosity of the propellant such that said propellant flows across said substrate and upward along said emitter during operation;
- an extractor electrode grid aligned above the longitudinal axis of each emitter such that when a voltage is applied across said extractor grid ions of said propellant are formed and pass through the apertures of said grid to produce thrust; and
- a porous reservoir for a propellant.

In another embodiment, the relative dimensions of the pores of the reservoir, the roughness of said substrate and the grooves of the emitters decrease in size from reservoir to substrate to emitter such that the propellant is at least partially drawn from the reservoir across the substrate an upward along the emitter via a passive capillary action.

In yet another embodiment, the grooves of the emitters have dimensions of from about 5 to 10 microns in width.

In still another embodiment, the emitters each include a plurality of grooves extending from the proximal to the distal end thereof.

In still yet another embodiment, the surface roughness of the substrate is formed by etching, and wherein the roughness of the surface is from 20 to 30 microns.

In still yet another embodiment, the pores of the reservoir are on the order of about 100 microns.

In still yet another embodiment, the thruster also includes a porous propellant distributor disposed in fluid interconnection between the reservoir and the substrate. In such an embodiment the pores of said distributor may be on the order of from 50 to 100 microns. In another such embodiment, the reservoir and the distributor are formed of a porous carbon material coated with a metal selected from the group consisting of nickel, titanium and tungsten.

In still yet another embodiment, the propellant is at least one of the metals selected from the group consisting of indium, gallium, or alloys thereof.

In still yet another embodiment, the surface of the extractor electrode grid is grooved and/or roughened, and the grid is in thermal communication with a heating element capable of uniformly heating said extractor electrode grid to a temperature sufficient to melt the propellant and reduce the viscosity of the propellant to a level such that the propellant is able to flow across said extractor grid and along said grooves. In one such embodiment, the extractor grid is formed of a titanium coated silicon material or other conductive film that is compatible with indium and will not contaminate the emitters.

In still yet another embodiment, the heating element can heat the substrate to a temperature of between 171 and 200° C. at a rate of about 1 to 2° C./s. In one such embodiment, the heating element is formed of a titanium film between an insulating surface film and a Pyrex chip.

In still yet another embodiment, the substrate and emitters are formed from silicon.

In still yet another embodiment, the reservoir and the emitters are on opposing sides of said substrate.

In another embodiment, the invention is directed to a method of forming a field emission electric propulsion emitter array.

In one such embodiment, the method includes the following steps:
- providing a porous substrate having at least one substantially planar surface;
- forming on the surface a plurality of emitters extending perpendicularly thereto, wherein each of said emitters have at least one groove extending axially along the length of said emitter from the proximal to the distal end thereof;
- roughening the surface; and
- metalizing the porous substrate and said emitters by disposing a first Ti layer under vacuum and then without breaking said vacuum disposing a second layer of a propellant material thereon.

In another such embodiment, the grooves of the emitters have dimensions of from about 5 to 10 microns in width and may have smaller scale roughness.

In still another such embodiment, the emitters are each formed with a plurality of grooves extending from the proximal to the distal end thereof.

In yet another such embodiment, the surface roughness of the substrate is formed by etching, and wherein the roughness of the surface is from 20 to 30 microns.

In still yet another such embodiment, the metalized coating is formed by electron beam, sputter or electro deposition.

In still yet another such embodiment, the Ti layer is on the order of 200 nanometers. In such an embodiment the propellant layer is on the order of 3 microns.

In still yet another such embodiment, the propellant is at least one of the metals selected from the group consisting of indium, gallium, or alloys thereof.

BRIEF DESCRIPTION OF THE DRAWINGS

The description will be more fully understood with reference to the following figures and data graphs, which are presented as exemplary embodiments of the invention and should not be construed as a complete recitation of the scope of the invention, wherein:

FIG. 3 shows a schematic view of the operation of a single (A), and an array (B) of electrospray emitters in accordance with the current invention;

DETAILED DESCRIPTION OF THE INVENTION

The current invention is directed generally to an electrospray thruster, and, more particularly, to an electrospray thruster that increases thrust density of conventional electrospray thrusters by miniaturizing the individual components of the thruster thereby allowing for the increase in the number and density of thruster tips.

Conventional Electrospray Thrusters

Before turning to the design and implementation of the novel electrospray thrusters of the instant invention, the limitations of conventional thrusters need to be detailed. In particular, the problem being solved in the development of the novel miniaturized electrospray thrusters of the instant invention is the limited thrust density available from currently available conventional macroscale electrospray thrusters and their high mass and volume that are limiting these thrusters' applicability.

Figure 1B:
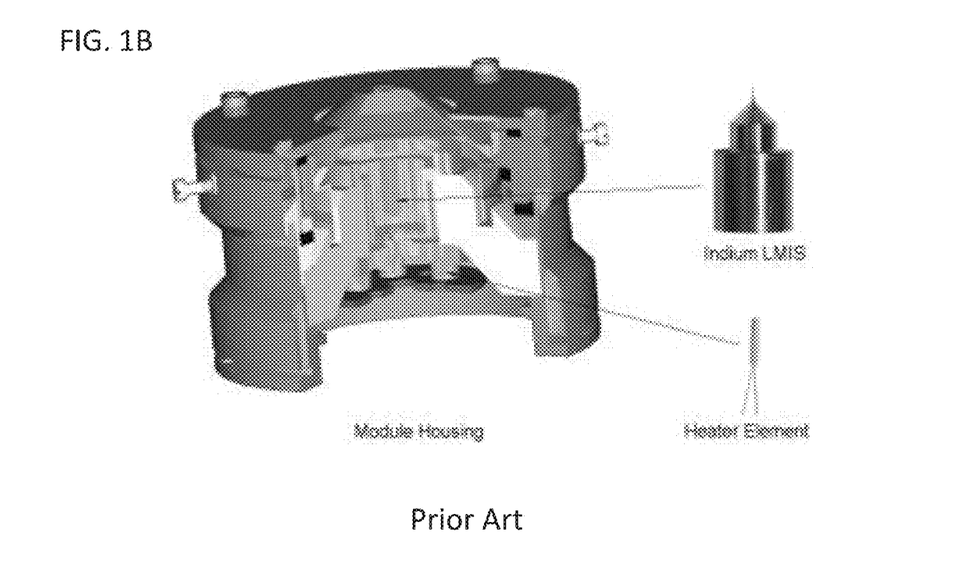
FIG. 1B shows a conventional macro emitter thruster configuration.

As shown in FIG. 1A, a conventional electrospray thruster (10) feeds propellant (12) to the tip of an externally wetted needle emitter (14) or an internally fed capillary tube and then extracts a beam of charged particles (16) from it with high electric fields applied between the emitter tips and an extractor electrode (18). FIG. 1B shows an electrospray thruster assembly exemplary of this type that uses indium propellant and an externally wetted needle emitter. As shown, the indium Liquid Metal Ion Source (LMIS) provided in this device includes a needle emitter and a propellant reservoir. The heater element shown (inset) slides into it. Macroscale electrospray thrusters of this type have been flight qualified. In such a design, a 4×4 array of such thrusters, each with single emitter needles, consumes a 10×10 cm footprint of space with a mass on the order of kilograms, while the individual emitter needle diameters are only ~0.2 mm in diameter and several millimeters long. In short, the current per needle emitter and packing density are severely limited in such conventional configurations.

Microelectrospray Thrusters: Introduction

The micro-electrospray thrusters of the instant invention operate on the principal that much higher packing densities of emitter needles, and, in turn, thrust densities are possible using a microfabricated approach to thruster design. In short, by microfabricating the thruster components, and in particular the emitter needles, it is possible to provide a compact electrospray array thruster. For example, in the device shown in FIG. 2, sixteen microfabricated emitters can be disposed in a space as small as 4×4 mm. Accordingly, a microfabricated thruster, such as the one in FIG. 2, made in accordance with the current invention, would have a mass that is less than 10 g enabling the use of the technology for a broad range of mission applications, including 100 g spacecraft swarms, and a distributed propulsion system on deployable structures. Such a low mass is possible because of the microfabricated components. Moreover, an extraordinary thrust range of orders of magnitude could be made possible with such a device by operating the thruster in both an ion and charged droplet emission mode, and by varying emitter array size.

Figure 2:
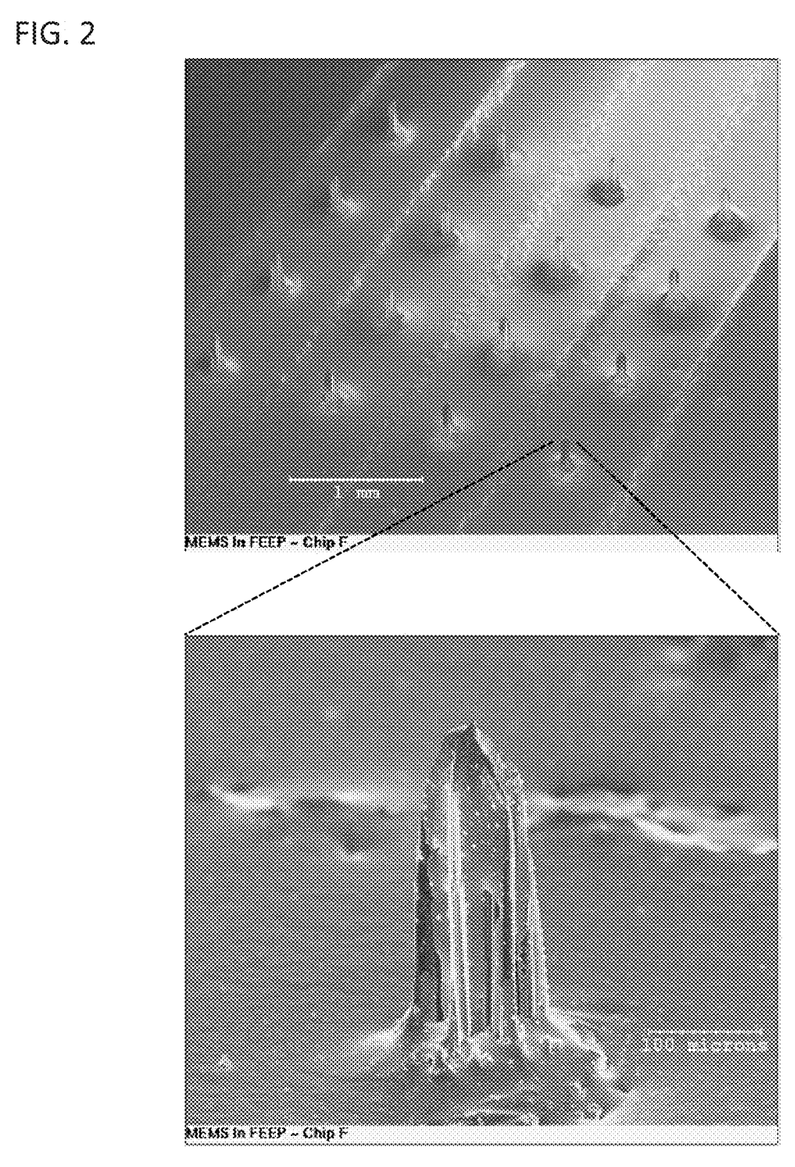
FIG. 2 shows an SEM of an array of emitter tips in accordance with the current invention, and a magnified view of a single emitter tip in accordance with the current invention (inset)

As a comparison, while the conventional macroscale FEEP thruster shown in FIG. 1A could deliver 160 microNewtons from the 10×10 cm sixteen emitter array (at 100 uA/emitter), a microfabricated array of 5,000 emitters (such as one according to the current invention, and shown in FIG. 2 with 16 emitters) could deliver >1 mN (at only 5 uA/emitter) from a 4×4 cm area with much lower flow rate requirements for the lower current level per emitter. In addition, this same technology could deliver <1 uN from a single emitter if necessary. Accordingly, there is a clear advantage in using microfabricated components in an electrospray thruster. However, miniaturizing the critical components of such a thruster are very difficult, and, to date, practical microfabricated electrospray thrusters remain elusive.

The first problem in miniaturizing conventional electrospray technology is in reproducing, on a small size scale, the required propellant wetting and flow along a chip and up the emitters to their tips sufficient to support uniform ion emission from a silicon-based microfabricated array of emitter needles. Commercially available indium ion sources use macroscale porous tungsten needles with external capillary channels that require propellant loading at temperatures that are incompatible with the thin films required in the manufacture of microfabricated thruster devices. Accordingly, in order to microfabricate emitter arrays it is necessary to devise axial grooves on the size scale of the microfabricated emitter tips capable of encouraging and channeling propellant flow in the same way that the needles and channels in macro emitters are critical to propellant flow in those devices.

A second problem with miniaturizing electrospray emitters with indium propellant lies in the way the device is heated during indium propellant loading and flow. It has been discovered that the heating regime used in macroscale devices is simply not compatible with the materials used in microfabricated silicon devices. Accordingly, new designs, processes, heating and propellant loading procedures are needed, and different materials implemented for a microfabricated approach to thruster devices to be realized.

As will be discussed in greater detail below, the microfabricated thrusters of the instant invention address these wetting and propellant flow issues by developing a process for metalizing and then pre-loading the emitter needles with propellant, developing a micro-fabricated heater, developing a heating procedure to enable uniform wetting and indium flow, designing a feed system geometry to control indium flow from the reservoirs to the emitters, and designing indium reservoirs to enable passive capillary indium flow in a flight compatible architecture.

Microelectrospray Thrusters: Detailed Description

Figure 3A:
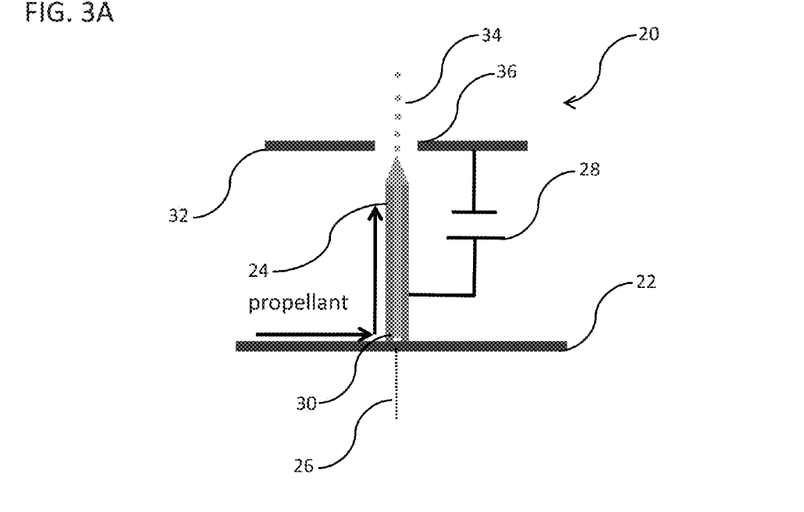
Figure 3B:
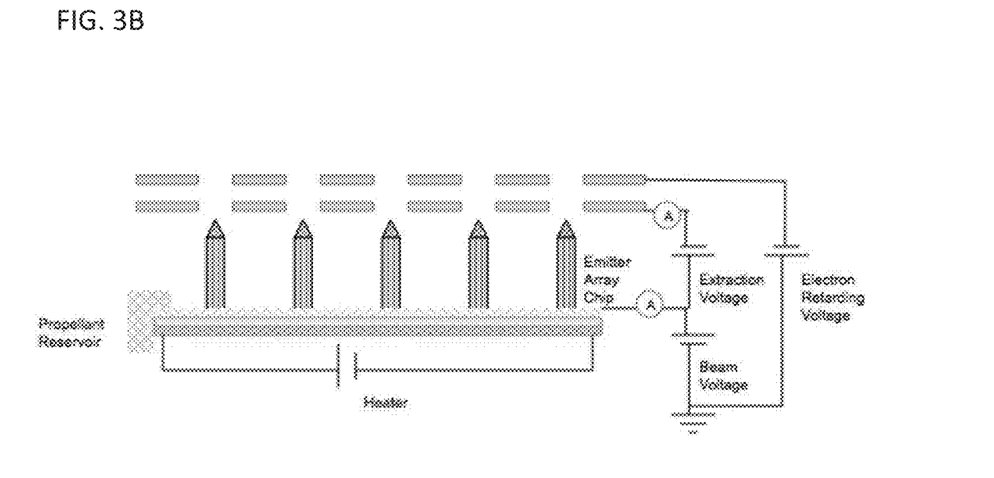

Turning now to the details of the microfabricated electrospray thruster design of the instant application. It should first be understood that a number of thruster emitter designs incorporating many of the basic features of the micro-electrospray thrusters of the current invention have been proposed. As shown in FIGS. 3A and 3B, these devices (20) all typically incorporate a substrate (22) onto which a plurality of emitter tips, pedestals, needles, etc. (24) have been disposed. As shown in FIG. 3A, each tip (24) generally has a central axis (26), and each tip has one end formed from or attached to the substrate, and a tapered opposing end. As described above, covering the substrate and pedestal is a film of propellant, such that when a negative potential (28) is applied to an extractor electrode (32) propellant ions are drawn from the tip to form an ion stream (34), which passes through an aperture (36) centered about the emitter tip axis (28).

Figure 4A:
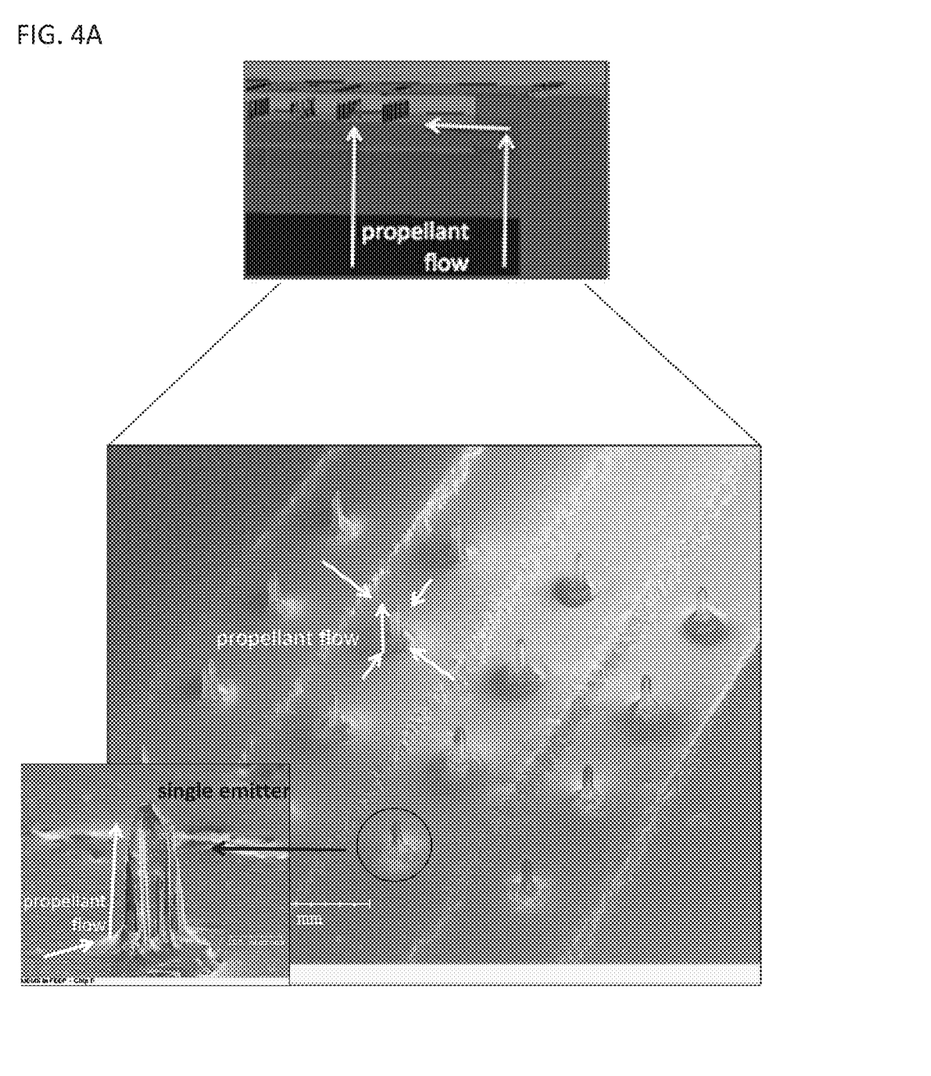
FIG. 4A shows images and schematics of an exemplary electrospray emitter array using an indium fuel in accordance with the current invention.
Figure 4B:
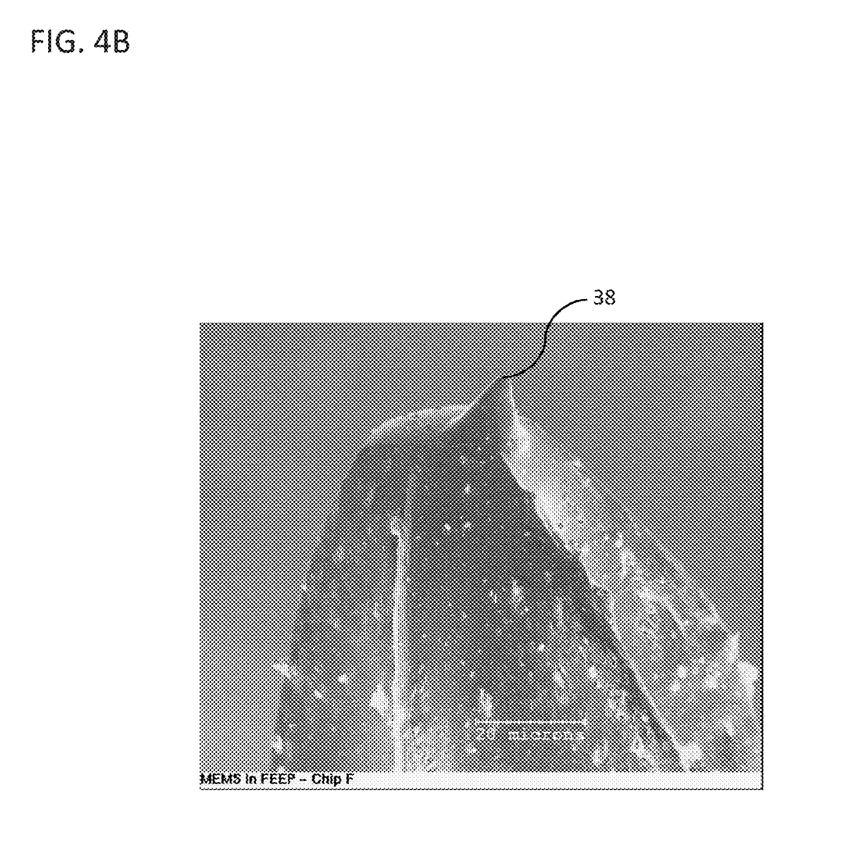
FIG. 4B shows a magnified image of a microfabricated emitter tip having a Taylor cone in accordance with the current invention

Likewise, many different emitter tip designs have been proposed, and for the purposes of the current invention the emitter tips themselves may take any suitable shape. As shown schematically in FIG. 3 in the SEM in FIG. 2, typically emitter tips are constructed with a circular symmetry about its axis, and include features such as grooves or scallops cut into the outer surface of the tip to act as channels for the conduction of propellant from the planar substrate (22) up the walls of the tip (24) via the grooved channels (30), and to the distal end of the emission tip. In such an embodiment, as shown in FIGS. 3A and 4A, the propellant (arrows) travels either through or along the surface of the substrate and through the channels or grooves that converge to the distal end of the emission tip, where the separating ions respond to the concentrated electric field by forming a Taylor cone. FIG. 4B shows magnified details of the structure of the emitter tip shown in FIG. 4A, including the Taylor cone (38), which forms the critical region where the propellant forms a cone further concentrating the enhanced electric field density and such that charged particles are drawn from the surface of the Taylor cone and accelerated by the potential difference between the emitter and extractor electrodes to form the ion streams. Thrust levels on the order of 0.1-1 microNewtons are generated from each emitter.

In turn, the propellant reservoir (not shown) may be couple to the substrate and the emitter tips through any suitable aperture, such that the propellant is drawn from the reservoir and then upwards along the grooves disposed in each emitter tip. These reservoirs typically store the propellant, such as Indium, in bulk, but alternatively, reservoirs made of porous material with a high melting point, such as porous tungsten, have been proposed. During operation, the reservoir is heated to slightly above the melting point of the propellant, such that the propellant, such as, for example, indium impregnated into porous tungsten, is allowed to wick through the substrate surface and upward through the emitter tip grooves.

Turning to the construction of the extractor electrode, as shown schematically in FIGS. 3A and 3B, the ion extractor electrode (32) is generally positioned substantially parallel to the surface of the substrate and the electrodes are provided with an aperture (38) corresponding to each emitter tip axis (26). In addition to the ion extractor electrode, other electrodes may also be provided, such as focusing electrodes for attracting, forming, and focusing the ion beam and preventing electrons from back-streaming through to the emitter. The number of focusing electrodes and inter-electrode spacing may vary according to the application, but the objective of such focusing electrodes is generally to produce substantially parallel ion trajectories at the exit point of the thruster.

In addition, in these devices, residual charges in the emitted ions may be neutralized by spraying a source of negatively charged ions or electrons at the accelerated Indium ions, thereby minimizing the space charge effect, whereby the like-charged Indium ions tend to repel each other and generate a larger plume of ions than would be produced by charge neutralized ions. In such an embodiment, any suitable device, such as, for example, a charge balance injector, may be provided to neutralize the ions.

In terms of the choice of materials, the substrate for the microfabricated thrusters is typically governed by the ease of machining, often using chemical etching or chemical machining, as is known in the art of Micro-Electro-Mechanical Systems (MEMS), where features are etched on a substrate material such as Silicon. Likewise, although the use of an indium propellant will be discussed herein, propellants which are good candidates for use in electrospray thrusters include, in addition to indium, gallium, alloys of these metals, and more broadly, metals with a melting point in the range of 300° K to 700° K. However, in addition to such metal propellants, ionic propellants may be also used in the thruster with the externally wetted needles or internally wetted capillary emitter arrays.

Although the above elements, substrate, emitter tip, extractor electrode, heater, and propellant feed mechanism are required for the operation of any ion thruster, whether of a macro or micro scale, there are several additional features that it has been discovered are necessary and essential to the construction and operation of a practical micro-electrospray thruster. Some of these features include:
- Engineering the initial loading of the propellant to ensure proper wetting of the device;
- Designing the emitter tips to ensure that a continuously wetted surface be available from the substrate surface to the tip of the emitter, and particularly in the regions responsible for feeding liquid metal to the Taylor cone;
- Providing a specially engineered heater such that the propellant remains at the appropriate viscosity during operation;
- Providing a heated extractor grid to allow for propellant overspray redistribution; and
- Providing a reservoir that allows for the efficient and effective feed of the propellant to the substrate and emitter tips.

The following discussion will provide the details of the advanced features that allow for the construction and operation of a practical micro-electrospray thruster in accordance with the current invention.

Propellant Loading Protocol

Although easily etched, one difficulty of silicon is that it is not easily wetted by the propellant candidates, such as indium or gallium, used in electrospray thrusters. In particular, low melting temperature metal propellants, such as indium or gallium, typically have undesirably high surface tensions and tend to resist forming initial conformal coatings, instead forming isolated spherical depositions when sputtered. Accordingly, it has been shown that it is advantageous to apply a surface metallization after machining the substrate and emitter tips to ease the initial application of the propellant. In the past, suitable metal materials have included tungsten over titanium or titanium, or any combination of these metals.

In the current invention, the tungsten wetted surface that is used in macroscale indium ion sources is replaced with a titanium film. A titanium film is advantageous in microscale applications because the indium wets it and does not form a eutectic with it at the operating temperatures, which would result in the materials being carried away in the indium at the required operating temperatures. Typically, the substrate must be coated with a metallization thickness of at least 10,000 Å to ensure sufficient coverage.

In addition to the use of titanium coatings, the current invention also recognizes that the process of how these metals are applied is equally critical to the proper loading of the propellant. In particular, in the current invention the emitters are metalized using electron beam evaporation with a thin film of titanium as an adhesion layer, and then a ~3 micron film of propellant (e.g., indium). The films are applied consecutively using this technique without breaking vacuum. It has been discovered that this propellant loading procedure was required to enable good propellant wetting and flow with a tungsten adhesion layer and proven to be effective with titanium also. [Otherwise the layer of oxygen on the surface of the tungsten would form indium oxide at the interface to prevent adhesion. Then heating it to a temperature of >1000° C. was required to melt the oxide, and film determination was observed during cool-down from this high temperature.] This characteristic is especially important for the thin adhesion film required on microfabricated silicon structures, but is not important in the macroscale emitters because of the amount of the tungsten material that may be used. Although this emitter metallization is necessary for some propellants, such as, for example, indium, it will not be required for all propellants. Some propellants will require other adhesion layer materials and some may wet silicon and not require it.

Emitter Tip and Substrate Design

In addition to the loading of the propellant, the current invention recognizes that the disposition of microfabricated silicon emitters with axial grooves (as shown in FIGS. 2 and 4) and a roughened or porous surface between the emitters is essential to enable capillary force driven flow from the porous propellant distributor, through or along the substrate to the emitter tips and along the emitter grooves to the apex of emitters. In particular, it has been determined that the substrate surface roughness, which should be on the order of ~20-30 µm, and the axial emitter grooves that run along the length of the emitter tip, which should be on the order of ~5-10 µm wide, enable passive capillary flow from the propellant distributor along the substrate to the emitter tips when the chip is heated to temperatures above the melting temperature of the propellant. It has also been determined that the shape and number of the grooves on the emitters and the tip sharpness passively control the propellant flow rate along them to enable operation at the flow rates required for ion or droplet emission modes.

These grooved emitter arrays with roughened substrate between them is a critical innovation for successful operation of the thruster. Without such surface roughness, capillary flow will be inhibited from moving along the tapered opposing end portions of the pedestals towards their sharp points. Surface roughening may be accomplished by any suitable technique, such as, for example, chemical etching, method of sputtering, or any technique, which results in the required surface roughness.

Temperature Control of Substrate

It has also been found that controlling the substrate temperature can enable the control of the flow rate of the propellant by changing the fluid viscosity. Accordingly, in the current invention a heater disposed to heat the entirety of the substrate is disposed in the thruster such that the temperature of the substrate can be controlled. In one embodiment, the heater design consists of titanium (~0.1 um thick) coated Pyrex substrates that are resistively heated by a few watts. The amount of heating provided to the substrate would be determined by the propellant. In short, sufficient heating would be provided to ensure that the propellant softens and the viscosity is low enough to allow the material to flow through or along the substrate to the emitters. For example, for an indium fuel the heating procedure developed requires slowly increasing the temperature at ~1-2° C./second up to ~171° C. to ~200° C. to get uniform heating and avoid propellant de-wetting from the emitters. Of course, it will be understood that this heating profile will depend on the properties of the propellant.

Temperature Control of Extractor Electrode

It is also advantageous to provide the extractor electrode grid with surface grooves and or surface roughness and an embedded heater such that any propellant overspray onto the grid is redistributed away from the apertures in it. Absent this feature, propellant deposited in the aperture could eventually partially close it and block the beam transmission through it.

Reservoir Design

In conventional macro electrospray thruster emitters a continuous emitter wire and coil is typically used for propellant storage and axial emitter wire grooves for propellant delivery to the emitter tips. In the current invention both the propellant reservoir and the propellant distributor are of a porous nature and is coated with a material that would allow wetting of the wall of the porous reservoir by the propellant. In one preferred embodiment, the porous reservoir and propellant distributor consist of a nickel-coated carbon foam that is electro-plated with titanium and then indium and then filled with indium to provide large supplies of indium to the emitter array. The pore size in the reservoir is ~100 microns. For larger reservoirs an internal cavity can be provided to allow for higher propellant storage volumes. The same material is used for the propellant distributor to the emitter array, and the pore size in the distributor is preferably from ~50-100 microns. In particular, the pores on the reservoir and propellant distributor need to be larger than the average surface roughness of the substrate to encourage passive capillary flow from the reservoir through the distributor and across the substrate. It has been found that the use of a porous reservoir and distributor is critical for uniform propellant delivery from a common reservoir to a large array of emitters such as that used in the instant invention.

Exemplary Embodiments

The person skilled in the art will recognize that additional embodiments according to the invention are contemplated as being within the scope of the foregoing generic disclosure, and no disclaimer is in any way intended by the foregoing, non-limiting examples.

With the above challenges and critical elements in mind, in one exemplary embodiment, as shown schematically in FIGS. 5A to 5G and 6, the micro-electrospray thruster (40) of the instant invention consists essentially of a microfabricated array of metalized grooved silicon emitter needles (42), positioned atop a microfabricated heater (44) and behind an electrode (46) with an aperture array (47) aligned with the needles. The device further has a passive capillary force driven feed system utilizing a propellant (48) that is stored in the solid phase in a porous reservoir (50) that is integrated into the feed device (52).

Figure 5:
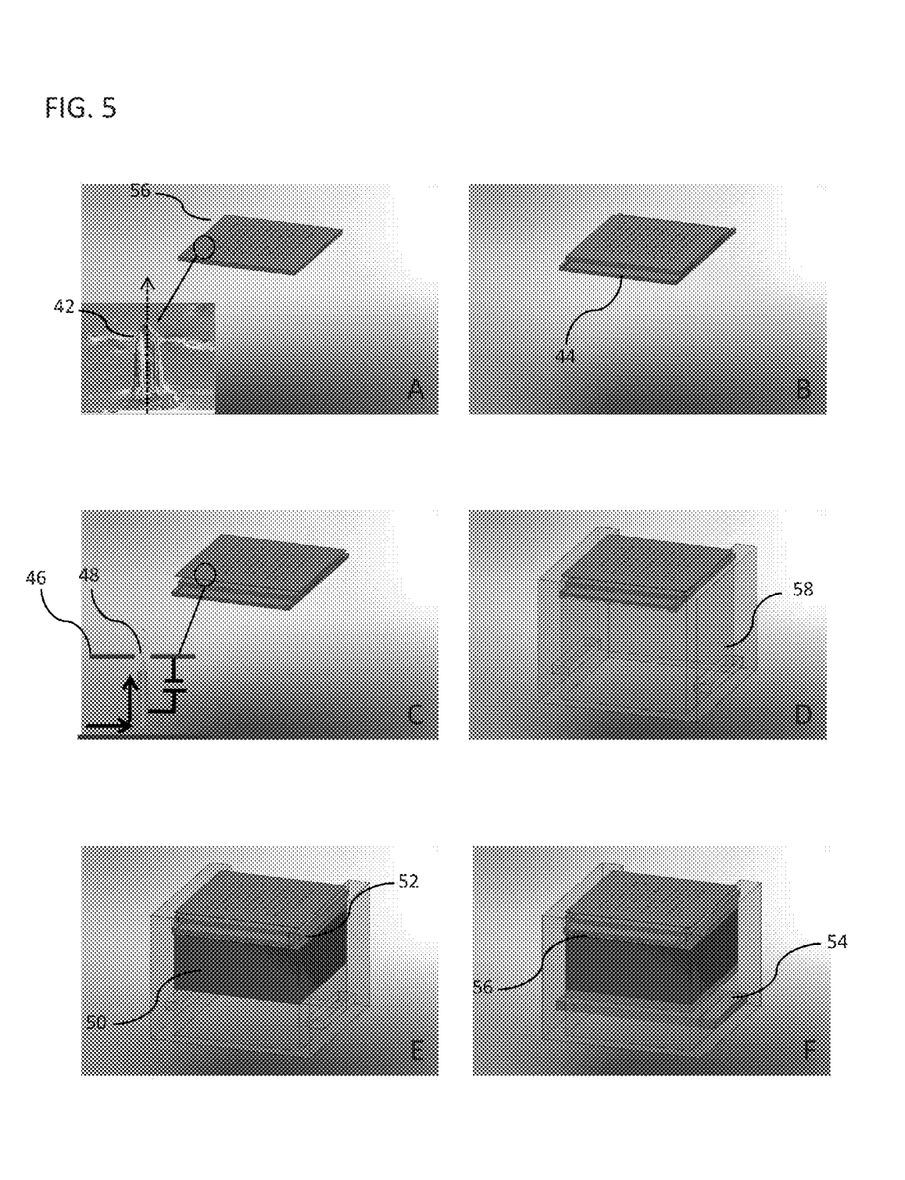
FIGS. 5A to 5F show exploded views of an exemplary microfabricated electrospray thruster in accordance with the current invention.
FIG. 5G shows an assembly view of an exemplary microfabricated electrospray thruster in accordance with the current invention.
Figure 5G:
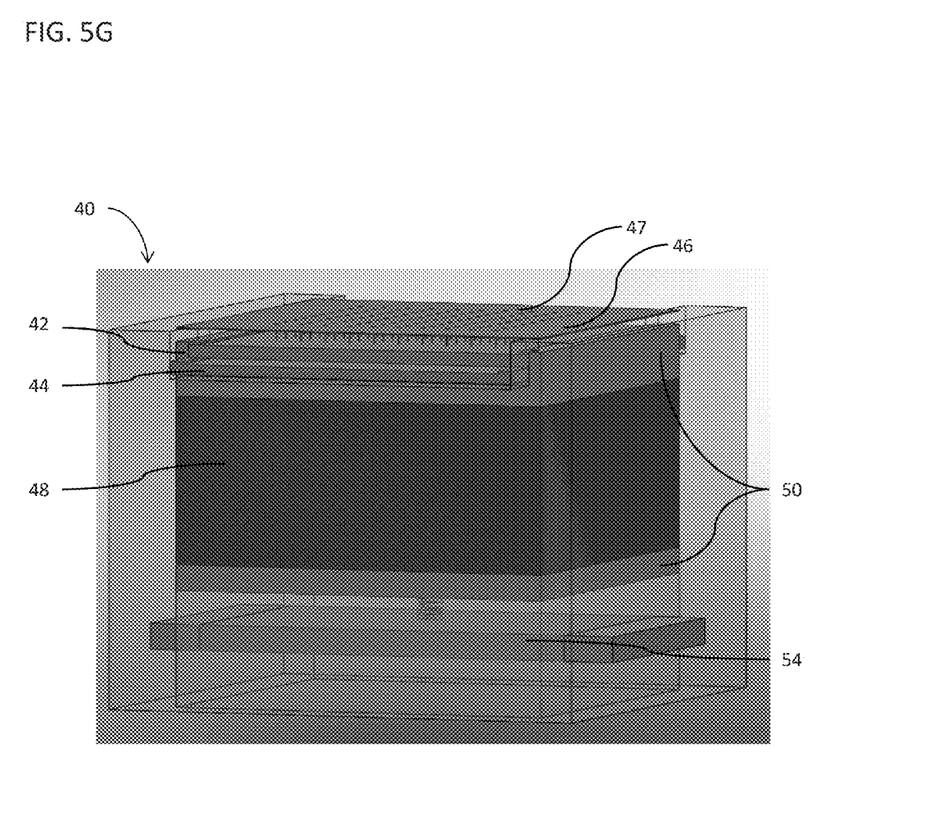

As described above, in the exemplary embodiment of the micro-electrospray thruster, each of the emitter needles or tips (42) are provided with an axial groove ((54) FIG. 5A, inset) on the order of 5 to 10 µm wide and that stretches along the entire length of the tip. In addition the surface of the substrate (56) onto which the emitter needles (42) are disposed is roughened on the order of ~20 to 30 µm to provide enhanced flow and wettability to the propellant. In addition, the surface of the substrate and the emitter tips is metalized prior to loading the propellant with a coating of titanium at least 2000 Å thick. Although any suitable material may be used to form the substrate and emitter tips, in one preferred embodiment, the base material is silicon.

As shown in FIG. 5B, the heater (44) is integrated with the substrate such that the entire substrate can be heated evenly at a very low rate of ~1 to 2° C./second up to a temperature that allows for the flow of the propellant across the substrate surface. For example, in the case of indium the heater would heat from ~171° C. to ~200° C.

An extractor electrode (46) having an aperture array (47) aligned with the axis of the emitter tips is provided distally adjacent to emitter tips, as shown in FIG. 5C. As described earlier, the voltage applied to the extractor electrode, the number of additional focusing electrodes, and the method of applying the voltage are subject to the specific application. Any suitable combination of voltage, voltage cycling and focusing electrodes may be used with the emitter array of the invention so long as the ions ejected from the emitter tips are directed away from the thruster, preferably in paths substantially in alignment with the axes of the emitter tips. However, in a preferred embodiment, a silicon extraction electrode is used wherein the surface of the electrode is grooved, and wherein an embedded heater is provided such that any overspray of propellant that gathers on the electrode grid is redistributed across the grid to prevent island building on the grid surface and aperture closure. In addition, the extraction grid is metalized with a high conductivity material so that the required electric field can be established when high voltage is applied to it. In addition, the metalized layer can serve to provide a good wetting layer to the extraction grid.

The design of the propellant reservoir and propellant feed system are shown schematically in FIGs. D to F. As described above, the key aspect of the reservoir (50) and feed drive system (52) is that a porous reservoir and distributor be used having pores of preferably from ~50 to 100 microns (but at least larger than the surface roughness scale of the substrate (~20 to 30 microns) such that passive capillary forces may be used to draw the propellant (48) from the reservoir onto the substrate, and thereon to the emitter tips. In the embodiment shown in FIG. 5F and in the assembly schematic of FIG. 5G, the reservoir and drive system are spring loaded (54) such that the reservoir is constantly urged into contact with the underside of the substrate (56) or precision machined for the required contact. Although any suitable materials can be used, and in particular any porous material having a coating disposed thereupon that allows for the wetting of the propellant material on the porous material. In one embodiment, Ultra met nickel, tungsten or titanium coated carbon foam reservoirs are used.

Although a particular square surrounding case (58) design is shown in these figures, it should be understood that the thruster is not limited to this geometry. Indeed, as long as the emitter array, heater, extractor electrode and reservoir are provided with the features described, the thruster can take any shape desired. Again, although any suitable material may be used to form the supporting structure of the thruster, in one preferred embodiment the material is Pyrex, and the device is manufactured using MEMS and the other components (bonded silicon extraction grids, emitter array, porous propellant distributor and porous propellant reservoir) anodically bonded thereto. Moreover, although certain numbers of emitter tips are shown in relation to this particular embodiment, it should be understood that any number of emitter tips may be used in accordance with the current invention.

Figure 6:
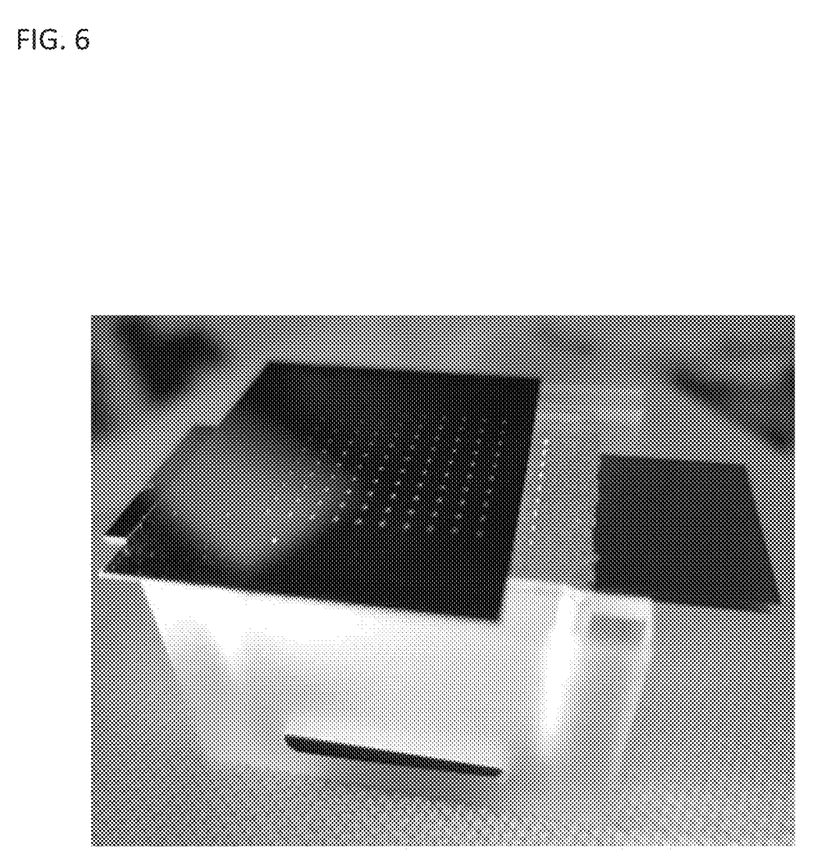
FIG. 6 shows an image of a microfabricated electrospray thruster in accordance with the current invention.

FIG. 6 provides an image of a microfabricated electrospray thruster made in accordance with the above description. As shown, a grid of sixteen emitters is provided in this exemplary embodiment. The overall weight of the thruster is less than 10 g. In this embodiment the following components were utilized:

An emitter array formed of metalized silicon is provided, the emitters are metalized using electron beam evaporation of titanium as an adhesion layer followed by a ~3 micron film of indium.

Each emitter tip is provided with an axial groove that run the length of the tip and has width dimensions on the order of ~5 to 10 microns.

The porous substrate is formed with a surface roughness of from ~20 to 30 microns.

An embedded heater formed of titanium coated Pyrex chips is placed in heating communication with the substrate such that the substrate and emitter array may be heated uniformly at ~1 to 2° C./second. In an embodiment having an indium propellant the substrate is heated up to ~171° C. to ~200° C.

The extractor grid is microfabricated from a silicon wafer. The surface of the grid is grooved and metalized with titanium to ensure good propellant wettability. In addition, the grid is provided with an embedded heater capable of heating the grid to a temperature of from ~171° C. and not higher than 200° C.

A porous reservoir and propellant distributor made from nickel-coated carbon foam is disposed in fluid arrangement with the emitter array. The pores of the reservoir and distributor range from ~100 microns in the reservoir to from between ~50 to 100 microns in the distributor such that passive capillary flow of the propellant from the reservoir to the emitter array is ensured.

Finally, the body of the device is formed using Pyrex such that the components are anodically bonded thereto for boltless assembly.

Figure 7:
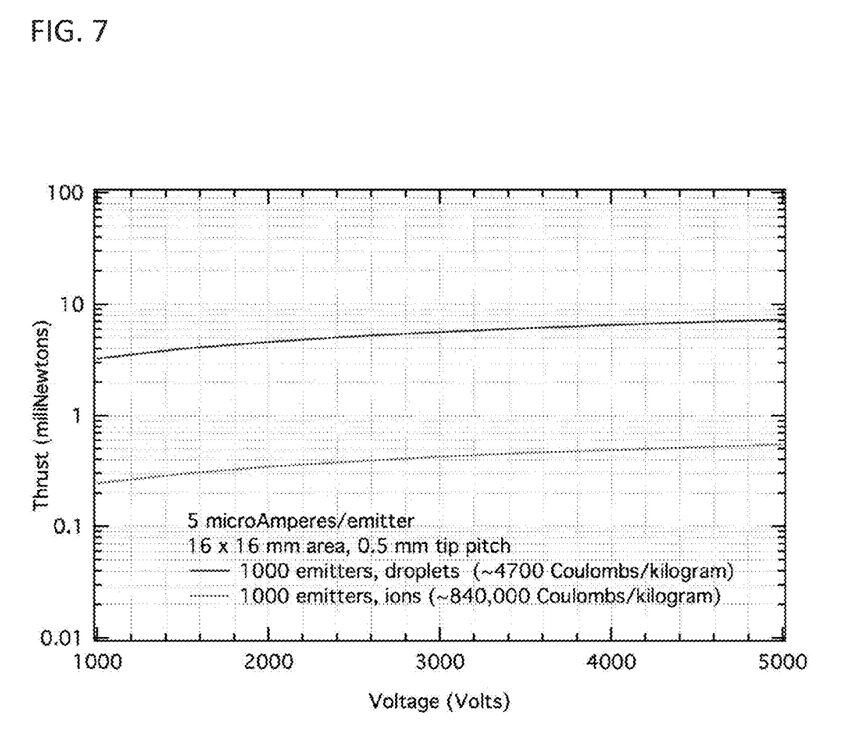
FIG. 7 shows a data graph providing a plot of thrust versus power in accordance with the number of emitters for an emitter array in accordance with the current invention for both ion and droplet modes.

FIG. 7 provides thrust data using the device shown in FIG. 6. The data shows that when the microfabricated thruster of the instant invention is coated with a propellant material, such as, for example, indium, heated to the melting temperature of indium, and biased with thousands of volts between the emitters and extractor electrode, the propellant is pulled into a liquid cone and a charged particle beam extracted from the emitter tips and accelerated to generate thrust at very high specific impulse levels (>7000 s) with ions or at much lower specific impulse levels (<700 s) with charged droplets, but much higher thrust. Accordingly, by varying the number and mode of operation of the thruster of the instant invention it is possible to provide a range of thrust magnitude that is orders of magnitude large. The flexibility suggested by this wide range of thrust, and the very low weight to thrust ratio of the device will allow the device to be used in a wide variety of applications, including precision pointing, attitude control, disturbance reduction, and orbit transfer.

DOCTRINE OF EQUIVALENTS

The particular embodiments described herein are for example only. It is clear that the various embodiments can be practiced separately or in combination. In particular, the various forms of liquid metal reservoir, the various liquid metals used as ion sources, the coatings or insulations applied to the extractor electrode, the types and number of focusing electrodes, the various structures of the ion charge neutralizers, and the manner in which voltage is applied to the ion extractor electrode to regulate and control the amount of thrust are each independent variations of the thruster invention which may be practiced alone or in combination.

In summary, while the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. An electrospray thruster comprising:
   a porous substrate having a plurality of emitters formed on a substantially planar surface thereof and extending perpendicularly thereto, wherein the planar surface of the substrate has a roughness; each of said emitters having at least one groove extending axially along the length of said emitter from the proximal to the distal end thereof;
   each of said porous substrate and said emitters further having a metalized coating comprising at least a first titanium layer and a further layer of a propellant material disposed thereon;
   a heater disposed in thermal relation to said porous substrate such that the substrate may be heated substantially uniformly to a temperature sufficient to reduce the viscosity of the propellant such that said propellant flows through and/or across said substrate and upward along said emitter during operation;
   an extractor electrode grid disposed substantially parallel to said planar substrate, said extractor electrode grid having an aperture aligned above the longitudinal axis of each said emitter such that when a voltage is applied across said extractor grid ions of said propellant are formed and pass through the apertures of said grid to produce thrust;
   a reservoir for a propellant, the reservoir being formed of a porous material and being in fluid communication with the porous substrate; and
   wherein dimensions of the pores of said reservoir, the roughness of said substrate and the grooves of said emitters decrease in size from reservoir to substrate to emitter such that the propellant is at least partially drawn from the reservoir through and/or across the substrate and upward along the emitter via a passive capillary action.

2. The thruster of claim 1, where the grooves of said emitters have dimensions of from about 5 to 10 microns in width.

3. The thruster of claim 1, where the emitters each include a plurality of grooves extending from the proximal to the distal end thereof.

4. The thruster of claim 1, where the surface roughness of the substrate is formed by etching, and wherein the roughness of the surface is from 20 to 30 microns.

5. The thruster of claim 1, where the pores of the reservoir are on the order of about 100 microns.

6. The thruster of claim 1, further comprising a porous propellant distributor disposed in fluid interconnection between the reservoir and the substrate, wherein the pores of said distributor are on the order of from 50 to 100 microns.

7. The thruster of claim 6, wherein the reservoir and the distributor are formed of a porous material coated with a metal selected such that indium will wet thereupon.

8. The thruster of claim 1, where the propellant is at least one of the metals selected from the group consisting of indium, gallium, alloys thereof, and ionic propellants.

9. The thruster of claim 1, where the surface of the extractor electrode grid is grooved, and wherein the grid is in thermal communication with a heating element capable of uniformly heating said extractor electrode grid to a temperature sufficient to reduce the viscosity of the propellant to a level such that said propellant is able to flow across said extractor grid and along said grooves.

10. The thruster of claim 1, wherein the extractor grid is formed of a titanium coated silicon material.

11. The thruster of claim 1, wherein the heating element can heat the substrate to a temperature sufficient to allow for the flow of the propellant at a rate of about 1 to 2° C./s.

12. The thruster of claim 1, wherein the heating element is formed of a titanium coated borosilicate glass material with an electrically insulating film disposed on the titanium layer.

13. The thruster of claim 1 where said substrate and emitters are formed from silicon.

14. The thruster of claim 1 where said reservoir and said emitters are on opposing sides of said substrate.

15. An indium-fueled electrospray thruster comprising:
    a porous substrate having a plurality of emitters formed on a substantially planar surface thereof and extending perpendicularly thereto wherein the planar surface of the substrate has a roughness;
    each of said emitters having at least one groove extending axially along the length of said emitter from the proximal to the distal end thereof;
    each of said porous substrate and said emitters being formed of silicon and further having a metalized coating comprising at least a first titanium layer and a further layer of indium disposed thereon;
    a titanium coated borosilicate glass heater disposed in thermal relation to said porous substrate such that the substrate may be heated substantially uniformly at a rate of about 1 to 2° C./s such that the viscosity of an indium propellant may be reduced such that said propellant flows through and/or across said substrate and upward along said emitter during operation;
    an extractor electrode grid disposed substantially parallel to said planar substrate, said extractor electrode grid having an aperture aligned above the longitudinal axis of each said emitter such that when a voltage is applied across said extractor grid ions of said indium propellant are formed and pass through the apertures of said grid to produce thrust, and where the grid is formed of a titanium coated silicon material, and where surface of the extractor electrode grid is grooved, and wherein the grid is in thermal communication with a heating element capable of uniformly heating said extractor electrode grid to a temperature a temperature of between about 171 and 200° C. to reduce the viscosity of the indium propellant to a level such that said indium propellant is able to flow across said extractor grid and along said grooves;
    a reservoir for an indium propellant, the reservoir being formed of a porous material and being in fluid communication with the porous substrate; and
    wherein dimensions of the pores of said reservoir, the roughness of said substrate and the grooves of said emitters decrease in size from reservoir to substrate to emitter such that the indium propellant is at least partially drawn from the reservoir through and/or across the substrate and upward along the emitter via a passive capillary action.

16. The thruster of claim 15, where the grooves of said emitters have dimensions of from about 5 to 10 microns.

17. The thruster of claim 15, where the emitters each include a plurality of grooves extending from the proximal to the distal end thereof.

18. The thruster of claim 15, where the surface roughness of the substrate is formed by etching, and wherein the roughness of the surface is from 20 to 30 microns.

19. The thruster of claim 15, where the pores of the reservoir are on the order of about 100 microns.

20. The thruster of claim 15, further comprising a porous propellant distributor disposed in fluid interconnection between the reservoir and the substrate, wherein the pores of said distributor are on the order of from 50 to 100 microns.

21. The thruster of claim 20, wherein the reservoir and the distributor are formed of a porous material coated with a metal selected such that indium will wet thereupon.

22. A method of forming an electrospray emitter array comprising:
   providing a porous substrate having at least one substantially planar surface;
   said planar surface having a roughness;
   forming on said surface a plurality of emitters extending perpendicularly thereto, wherein each of said emitters have at least one groove extending axially along the length of said emitter from the proximal to the distal end thereof; and
   metalizing said porous substrate and said emitters by disposing a first titanium layer under vacuum and then without breaking said vacuum disposing a second layer of a propellant material thereon; and
   providing a reservoir for an indium propellant, the reservoir being formed of a porous material and being in fluid communication with the porous substrate; and
   wherein dimensions of the pores of said reservoir, the roughness of said substrate and the grooves of said emitters decrease in size from reservoir to substrate to emitter such that the indium propellant is at least partially drawn from the reservoir through and/or across the substrate and upward along the emitter via a passive capillary action.

23. The method of claim 22, where the grooves of said emitters have dimensions of from about 5 to 10 microns in width.

24. The method of claim 22, where the emitters are each formed with a plurality of grooves extending from the proximal to the distal end thereof.

25. The method of claim 22, where the surface roughness of the substrate is formed by etching, and wherein the roughness of the surface is from 20 to 30 microns.

26. The method of claim 22, where the metalized coating is formed by a technique selected from the group consisting of electron beam, sputter and electro deposition.

27. The method of claim 22, wherein the titanium layer is on the order of 100 nanometers.

28. The method of claim 22, wherein the propellant layer is on the order of 3 microns.

29. The method of claim 22, where the propellant is at least one of the metals selected from the group consisting of indium, gallium, or alloys thereof.

30. The method of claim 22 where said substrate and emitters are formed from silicon.

* * * * *